(12) United States Patent
Dillon

(10) Patent No.: US 8,565,915 B2
(45) Date of Patent: Oct. 22, 2013

(54) PNEUMATIC TUBE SYSTEM RECOVERY

(75) Inventor: David Michael Dillon, Parker, CO (US)

(73) Assignee: Swisslog Healthcare Solutions, Denver, CO (US)

(*) Notice: Subject to any disclaimer, the term of this patent is extended or adjusted under 35 U.S.C. 154(b) by 661 days.

(21) Appl. No.: 12/774,310

(22) Filed: May 5, 2010

(65) Prior Publication Data

US 2010/0286816 A1    Nov. 11, 2010

Related U.S. Application Data

(60) Provisional application No. 61/175,714, filed on May 5, 2009.

(51) Int. Cl.
G06F 7/00     (2006.01)
B65G 51/36    (2006.01)
B65G 51/26    (2006.01)

(52) U.S. Cl.
USPC ............ 700/230; 700/225; 700/229; 700/224

(58) Field of Classification Search
None
See application file for complete search history.

(56) References Cited

U.S. PATENT DOCUMENTS

| | | | |
|---|---|---|---|
| 2,679,990 A | 6/1954 | Mathzeit et al. | |
| 2,710,728 A | 6/1955 | Halpern | |
| 2,893,660 A | 7/1959 | Cook et al. | |
| 3,236,475 A | 2/1966 | Mach et al. | |
| 3,580,272 A * | 5/1971 | Sherman et al. | 137/486 |
| 3,627,231 A | 12/1971 | Kalthoff | |
| 3,817,476 A | 6/1974 | Martin | |
| 3,951,461 A | 4/1976 | De Feudis | |
| 4,058,274 A | 11/1977 | Hochradel et al. | |
| 4,354,775 A | 10/1982 | Jalas | |
| 4,563,112 A | 1/1986 | Mokuya et al. | |
| 4,630,216 A | 12/1986 | Tyler et al. | |
| 4,766,547 A | 8/1988 | Modery et al. | |
| 5,038,290 A | 8/1991 | Minami | |
| 5,165,826 A | 11/1992 | Egbert | |
| 5,217,328 A | 6/1993 | Lang | |
| 5,234,292 A | 8/1993 | Lang | |
| 5,237,931 A | 8/1993 | Riedl | |
| 5,267,173 A | 11/1993 | Tanizawa et al. | |
| 5,375,691 A | 12/1994 | Wirtz | |
| 5,562,367 A | 10/1996 | Scott | |
| 5,682,820 A | 11/1997 | Arata | |
| 5,805,454 A | 9/1998 | Valerino, Sr. et al. | |
| 5,864,485 A * | 1/1999 | Hawthorne et al. | 700/229 |
| 5,896,297 A | 4/1999 | Valerino, Sr. | |
| 6,048,086 A | 4/2000 | Valerino, Sr. | |
| 6,173,212 B1 | 1/2001 | Valerino, Sr. | |
| 6,202,004 B1 | 3/2001 | Valerino, Sr. | |
| 6,477,442 B1 | 11/2002 | Valerino, Sr. | |
| 6,712,561 B1 | 3/2004 | Valerino, Sr. et al. | |
| 7,243,002 B1 | 7/2007 | Hoganson et al. | |
| 7,326,005 B1 | 2/2008 | Castro et al. | |
| 7,328,084 B1 | 2/2008 | Hoganson et al. | |
| 7,363,106 B1 * | 4/2008 | Hoganson et al. | 700/225 |
| 7,424,340 B2 | 9/2008 | Owens | |
| 7,751,930 B2 | 7/2010 | Valerino, Sr. | |

* cited by examiner

*Primary Examiner* — Yolanda Jones

(74) *Attorney, Agent, or Firm* — Russell T. Manning; Marsh Fischmann & Breyfogle LLP

(57) ABSTRACT

A system and method provides for the recovery of carriers stranded within a pneumatic carrier system. Initially, unresolved transaction records generated during the transit of carrier within the system are identified for carrier recovery purposes. System handling information is identified from the transaction record. Based on this information, the system determines a putative location of each a carrier associated with a transaction record. The system operates a segment of the pneumatic system including the putative carrier location to confirm the presence or absence of a stranded carrier. If a carrier is identified within that segment of the system, the carrier is deemed recovered. The carrier is then delivered to the destination location in the transaction record.

12 Claims, 10 Drawing Sheets

```
Transaction No. 12345
Origination location/Dispatch station   321

Destination location/Receiving Station 123

Pending
```

FIG.4A

```
Transaction No. 12345
Origination location/Dispatch station   321
        Dispatched 1:05 PM 03/20/2009
Destination location/Receiving Station 123
        Received 1:09 PM 03/20/2009
Travel Path/Handling Components
        Transfer unit       222
        Bypass Transfer     217
        TCU                 219
        MTU                 121
        TCU                 129
        Station             123
Closed
```

FIG.4B

```
Transaction No. 12345
Origination location/Dispatch station   321
        Dispatched 1:05 PM 03/20/2009
Destination location/Receiving Station 123

Travel Path/Handling Components
        Transfer unit       222
        Bypass Transfer     217

Active
```

FIG.4C

PNEUMATIC TUBE SYSTEM RECOVERY

CROSS-REFERENCE

This application claims the benefit of the filing date of U.S. Provisional Application No. 61/175,714 entitled "Pneumatic Tube System Recovery" having a filing date of May 5, 2009, the entire contents of which are incorporated herein by reference.

FIELD

The presented disclosure relates generally to the field of pneumatic tube carrier systems, and more particularly to a system and method for recovering carriers remaining in a pneumatic system after a shut down event.

BACKGROUND

Pneumatic tube carrier systems are a well-known means for the automated transport of materials between a multitude of user stations, any of which may be the origination location or destination location of a transport carrier. A typical system includes a number of pneumatic tubes interconnected in a network to transport carriers between various user stations. Various blowers and transfer units provide the force and path control means, respectively, for moving the carriers through and from tube-to-tube within the system.

Arrangement of the pneumatic tubes that connect the various locations may be in any manner that allows transfer of the carriers between various stations. Generally, a single pneumatic tube interconnects an individual station to the network. In this arrangement, such the single pneumatic tube transfers carriers to and from the station. Dedicated pneumatic tubes may connect other portions of the network. Complex pneumatic tube carrier systems may include scores or even hundreds of user stations.

Directing traffic in a pneumatic tube carrier system is a system control center (SCC). An SCC may determine carrier paths, or routes, through a system. In some instances, the SCC may dynamically alter carrier paths to avoid gridlock conditions. Current systems largely base routing determinations upon "predictions", or inferences, as to where each carrier "should be" within a system given the times/locations of entry and intended transport paths of all carriers concurrently handled by the system.

Occasionally, a system may misdirect a given carrier because of equipment error. Alternatively, a system may misdirect numerous carriers because of the presence of a "floater" carrier (e.g., an unidentified carrier) within a system. The presence of even a single, unaccounted for carrier may severely undermine the accuracy of a number of prediction-based determinations made by an SCC, thereby adversely impacting the handling of numerous carriers. This may require purging the system to remove all carriers from the components of the system.

In other instances, the system may shut down (i.e., partially or totally) after a disturbance to the normal operation of the system or carrier movement within the system. Examples of such disturbances include Urgent Off situations and temporary power loss by the SCC. Such situations may leave one or more carriers stranded within the system. Accordingly, it may be necessary to purge the system to recover any stranded carriers.

Purging a pneumatic system has typically entailed the sequential operation of each pneumatic component in the system for a period sufficient to ensure that, if a pneumatic component held a stranded carrier, the carrier passes to a subsequent component. Eventually, all stranded carriers exit the system, typically at a user station. However, delivery of the stranded carriers may not be to a correct user station. Further, such sequential purging is time consuming, often requiring an hour or more for a modest sized hospital system.

SUMMARY

Described herein are systems and methods (i.e., utilities) for carrier recovery in a pneumatic tube carrier system. A plurality of user interface devices/user stations positioned at various locations (e.g., origination/destination locations) and system components that effectuate delivery there between generally define the pneumatic system. The user stations are minimally configurable to send and receive carriers and to receive destination information for a carrier (e.g., as input by a user) sent by the station.

The system further includes a central controller, wherein the controller is configurable to receive destination information from interface devices and to associate the destination information for a particular carrier transport operation to a pending or active "transaction record" that may be stored to computer readable storage media. In turn, as the carrier moves within the system, the central controller is able to receive additional inputs indicative of the carrier location as it passes through the system. An active transaction record may record such inputs.

In a typical scenario, the central controller may receive an indication that a carrier is at an origination location (e.g., via a communications device located at the origination station). In conjunction with the receipt of this indication, a system user may enter destination information through a user interface device located at the origination station. The central controller may then associate origination information and the destination information to one or more database entries to initiate a pending carrier transaction record. In addition to origination and destination information, it will be appreciated that the database entries/transaction records may further include, inter alia, one or more of the following: date and/or time information (e.g., arrival/dispatch times), security information (e.g., access restrictions), status information, sender identification, and/or carrier type information. The central controller may then employ preprogrammed control logic to process a given transaction. That is, the central controller may determine a path for carrier travel through the system and provide control instructions to routing controllers to control carrier transport operations.

After launching a carrier into the system, the central controller may receive inputs from various pneumatic components along the path of the carrier. These inputs may be stored to the active transaction record. The transaction record records arrival once a carrier reaches a destination station and the transaction is "closed." The closed transaction record may be archived.

In one aspect, the utility may utilize carrier transaction records to facilitate a purge of the system after, for example, a power outage and/or an urgent off situation to recover carriers remaining in the system. This requires locating carriers within the system and, in one arrangement, routing those carriers to their intended destinations. For such purposes, the central controller may access active transaction records. The controller may then systematically purge the paths/routes associated with each active transaction record. That is, instead of purging the entire system, purging occurs only on the paths/routes associated with active/pending (i.e., unresolved) transactions. If a carrier is located on the route of an unresolved transaction record during a purge of that path/route, the system directs that carrier to the destination location associated with the corresponding transaction record. Alternatively, the system may route the carrier to a recovery zone. Once carriers for all active or otherwise non-resolved transaction records are routed either to their destinations or to a recovery zone, the system may resume normal operations without a full system purge. Such a utility may significantly reduce the time required to reinitiate normal operation of a pneumatic system after a shut down event.

According to another aspect, a utility is provided for use in recovering one or more carriers from a pneumatic carrier system. Initially, a pneumatic carrier system controller receives a carrier recovery request. Upon receiving such a request, the system controller is operative to obtain unresolved carrier transaction records that are stored on a computer readable storage medium. Such unresolved carrier transaction records may include pending transaction records for carriers that have not yet been launched into the system and/or active carrier transaction records for carriers that have proceeded part way through the system but have not arrived at their destination locations. For at least one unresolved carrier transaction record, the system controller is operative to identify system component transaction information from the transaction record. Such transaction information includes information related to one or more system components recorded as having contacted the carrier associated with the unresolved transaction record. Based on this transaction information, the system controller determines a segment of the pneumatic carrier system that putatively contains the carrier associated with the unresolved transaction record. In this regard, the utility may identify segments of the pneumatic carrier system believed to contain carriers of unresolved transaction records. Accordingly, operation of the pneumatic carrier system over these segments may confirm the presence or absence of the carrier. Upon identifying a carrier in the segment, the system presumes it to be the carrier associated with the unresolved transaction record. The system then routes the carrier to the destination location indicated in the transaction record.

The transaction record may include a plurality of entries of system components having handled the carrier associated with the unresolved transaction record. In such instances, it may be beneficial to identify the last system component having handled the carrier. In such instances, operation of this last system component may confirm the presence or absence of the carrier. For instance, if a transfer unit was the last component recorded as having contacted the carrier, the presumption arises that the carrier is between that transfer unit and a subsequent pneumatic component along an intended path/route of the carrier. That is, a presumption arises that the carrier is in a tube segment between the last handling component and a subsequent component. In such an arrangement, it may be desirable to provide airflow (vacuum/pressure) through that segment of the system to see if the carrier arrives back at the last component or a next/subsequent component. According, the system monitors the last system component and/or the next system component to identify the receipt of a carrier. If one of these components receives a carrier, it is presumed to be the carrier associated with the unresolved transaction record. Accordingly, the carrier may be delivered in accordance with destination information in the transaction record.

In a further arrangement, it may be desirable to identify system component status information of one or more of the system components having contacted or effectuated delivery of the carrier associated with the unresolved transaction record. Such status information may include, without limitation, port position settings of transfer unit devices, vacuum or pressure settings of blower units and/or sensor indications regarding the presence of absence of a carrier in a given system component. Such status information may be available to the controller in a data store. In alternate arrangement, the system controller may be operative to directly query one or more system components in order to obtain such status information.

In a further arrangement, the system controller may be operative to access sighting information for the carrier associated with the unresolved transaction record. For instance, in systems that include carrier identification capabilities (e.g., RFID chips, barcodes, etc.), the system may record carrier identification of a carrier as it passes through different portions of the system. For instance, one or more pneumatic tubes in addition to pneumatic system components may include reader devices that are operative to read the identification of a carrier as it passes. Accordingly, the transaction record may record this actual sighting information. The system may use this information to determine a likely location of the carrier within the system.

The system controller may be operative to generate an output to one or more user devices within the system in the event that a carrier is recovered or is not recovered. For instance, the system may provide an output to the user who requested the system recovery indicating: all carriers recovered; one or more of the carriers not recovered. In such an arrangement, the requesting user may take additional remedial steps if needed.

According to another aspect, a utility is provided for reinitiating carrier movement in a pneumatic carrier system after a shut down event. The utility includes accessing an unresolved carrier transaction record to identify unresolved transaction records. From the unresolved transaction record, the system controller is operative to determine the status information for at least a portion of the pneumatic system components associated with the unresolved transaction. Based on the status information, the controller infers a carrier location and reinitiates operation of one or more of the system components to continue movement of airflow through a portion of the system including the inferred carrier location. Such status information may include, without limitation, blower settings, port location settings and/or sensor status information. For instance, if a port position of a transfer unit is in a position that will receive a carrier from a previous system component recorded as having handled the carrier, the system may resume airflow into the transfer unit. Alternatively, if the transfer unit were in a dispatch port location, the system may establish airflow to continue movement of a carrier to a subsequent downstream component.

According to another aspect, predetermined travel path information is utilized to identify and/or recover carriers in a pneumatic carrier system. In this utility, the system controller is operative to identify unresolved transaction records and identify travel path information from such records. This travel path information may allow for determining system components along the intended route of a pneumatic carrier. The system components may then be queried and/or operated to continue movement of the carrier to its intended destination location.

Numerous additional configurations and advantages of the present invention as facilitated by the present invention would be apparent to those skilled in the art upon consideration of the further description that follows.

BRIEF DESCRIPTION OF THE DRAWINGS

FIGS. 4A-4C illustrate pending, closed and active transaction records, respectively.

DETAILED DESCRIPTION

Figure 1:
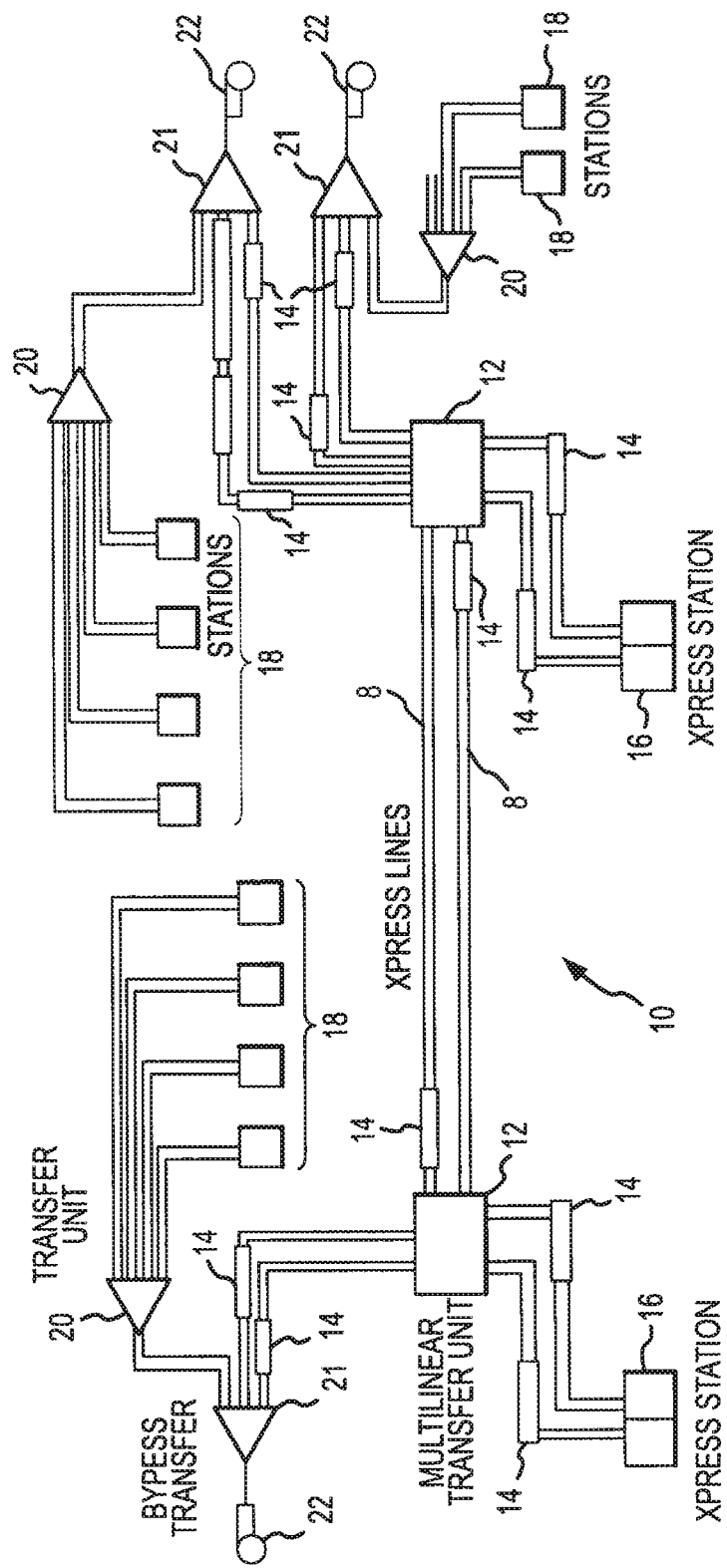
FIG. 1 discloses a mechanical diagram for an exemplary pneumatic carrier system.

In most contemporary pneumatic tube systems, open loop, interferential control is used to control the system and maintain the data about each transaction. This is possible because pneumatic tube systems are essential first in first out (FIFO) devices; as long as a control system (defined as the hardware, software and algorithms necessary to operate it as intended) is aware of a the order in which carriers/transactions are put into the tubes/pipes of the system, and careful count is kept of the number of entries and exits from these tubes/pipes the control system is capable of inferring which carrier is the one observed, considered, or counted.

A simplified example of such inferential logic is illustrated in a simplified pneumatic tube system where a single tube section is used. In such a system, inferential logic about the carriers, their status, and destination are easy to know based on inferential logic, e.g., 10 carriers entered the tube, 4 exited, therefore 6 remain. Similarly, since a length of tube is a physically constrained to be a FIFO system, the facts about the carriers remaining in the tube can be inferred by administering a simple stack data structure.

Control systems based on inferential logic are beneficial because of their simplicity, but they have serious short comings in practical application. First, their reliability is dependent on accurate reporting and maintenance of the datastacks. If the datastack becomes corrupt between what the control systems "thinks" and what is actually or physically in the system, misdirection of transactions can occur.

This is an unusual and perhaps impossible occurrence in the trivial, one dimensional system discussed earlier. However, when the system adds multiple components such as switches and accumulation devices that make it practical, useful and multi-dimensional, inferential logic begins to demonstrate its shortcomings. For example, each time the control system or the mechanical components themselves are disturbed or perturbated, the opportunity for a datastack corruption is presented. First, a user may defeat certain mechanical or software interlocks designed to maintain the FIFO data stack by sending two carriers but only asking for one (this can be referred to as "double pumping"). Second, equipment failures may cause the control to lose track of a carrier or transaction during operation in a specific area of the system. Third, and more broadly, a power failure or other external event may "blind" the control system for a period of time, perhaps causing it to lose track of all transactions working in the system. When the system again is able to "see", it must resynchronize its data stack, a virtual representation of the system, with what actually is present in the system. Failure to do so in a control environment using inferential logic can cause the system to mis-deliver carriers. This is colloquially known as a "one-off" situation; the systems data stack is has one or more errors relative to the actual physical system. Each new carrier that enters the end of the stack is given a destination for a carrier that is the one before or after.

When a perturbation occurs in a system using inferential logic as a control method, preventing systematic missed destinations requires a resynchronization process. In conventional pneumatic tube systems, a resynchronization is accomplished by performing a purge, or literally suspending normal system operation while the blowers, switches (transfer units), and stations perform a search for unaccounted for carriers (also referred to as "rogues", "shuttles", or "floaters").

Purge operations can be limited or broad in scope. They can affect the overall system, or they can affect a particular set of stations within a zone, or they can affect only certain specialized pieces of equipment. Regardless of the purge operations scope, all purge operation have a few common characteristics: (1) they require the system to suspend acceptance of carriers into the area being purged, (2) any, and perhaps all carriers found during purge are sent off to recovery stations, and frequently this is not the originator's intended destination, and (3) they consume vital system resources in the form of blower cycles or blower time reducing overall system performance. Finally and generally, purge operations are usually performed manually and at the discretion of the system manager or overseer, generally a person in the maintenance operations of the hospital.

Provided herein are systems and method (i.e., utilities) that may be implemented as a combination of hardware and software algorithms that perform various functionality in a pneumatic tube system. Such functionality may include detecting when an extraneous carrier is in the system and/or automatically correcting for such an extra carrier which may allow the system to proceed without user intervention. In another arrangement, if the normal operation of the system is perturbed for any of many possible reasons, the utility and its algorithms automatically determine the original, intended destination of the carriers, allowing the system to continue operation without requiring purge and resend of all the carriers. The algorithms and methods that enable this capability function with a database and various proprietary and routing and control enabling the system to use its existing, inferential hardware to accomplish the aforementioned functions. It can use other, closed loop control methods and hardware (i.e. bar coding and RFID) to enrich and provide a faster and more reliable system performance, though these hardware components are not essential to the invention's function as described.

FIG. 1 illustrates an exemplary pneumatic carrier system 10 within which various inventive aspects described herein are employable. In general, the pneumatic carrier system 10 transports pneumatic carriers between various user stations 16, 18, each such transport operation being referred to herein as a "transaction". At each of the user stations 16, 18, a user may insert a carrier, select/enter a destination address/identification and a transaction priority, and then send the carrier. The system determines a path to route the carrier and begins directing the carrier through the system.

Interconnected with each station 16, 18 is a transfer unit 20 which orders carriers arriving through different tubes from different stations 16, 18 into a single pneumatic tube. This pneumatic tube is further in connection with a vacuum bypass transfer unit 21 (i.e., turn around transfer unit) and a blower 22 that provides the driving pneumatic force for container movement. A set of transfer units 20, a blower 22 and one or more stations 16, 18 typically define a single zone, with a corresponding by-pass transfer unit 21 being a point of connection to a network and the other zones connected thereto.

Within the system 10, one or more devices are employable for ordering and routing carriers to their selected destinations. One type of device is a traffic control unit (TCU) 14, which is employable to receive, temporarily store and release a number of carriers. In certain configurations, one or more TCUs 14 may be provided to operate as linear storage devices, e.g., on a first in first out (FIFO) basis or last in first out (LIFO) basis. In other configurations, one or more TCUs 14 may operate as matrix style storage devices, which store carriers in two-dimensional matrixes, wherein each carrier is separately storable, retrievable and releasable without movement of other carriers, stored in the matrix. Also included in the system 10 are multi-linear transfer units (MTUs) 12 which have functionality to direct carriers from one pneumatic tube to another. For example, a MTU 12 may receive a carrier released by a TCU 14 in a first tube and direct the carrier along a second pneumatic tube in the system 10 to complete a given transaction.

Figure 2:
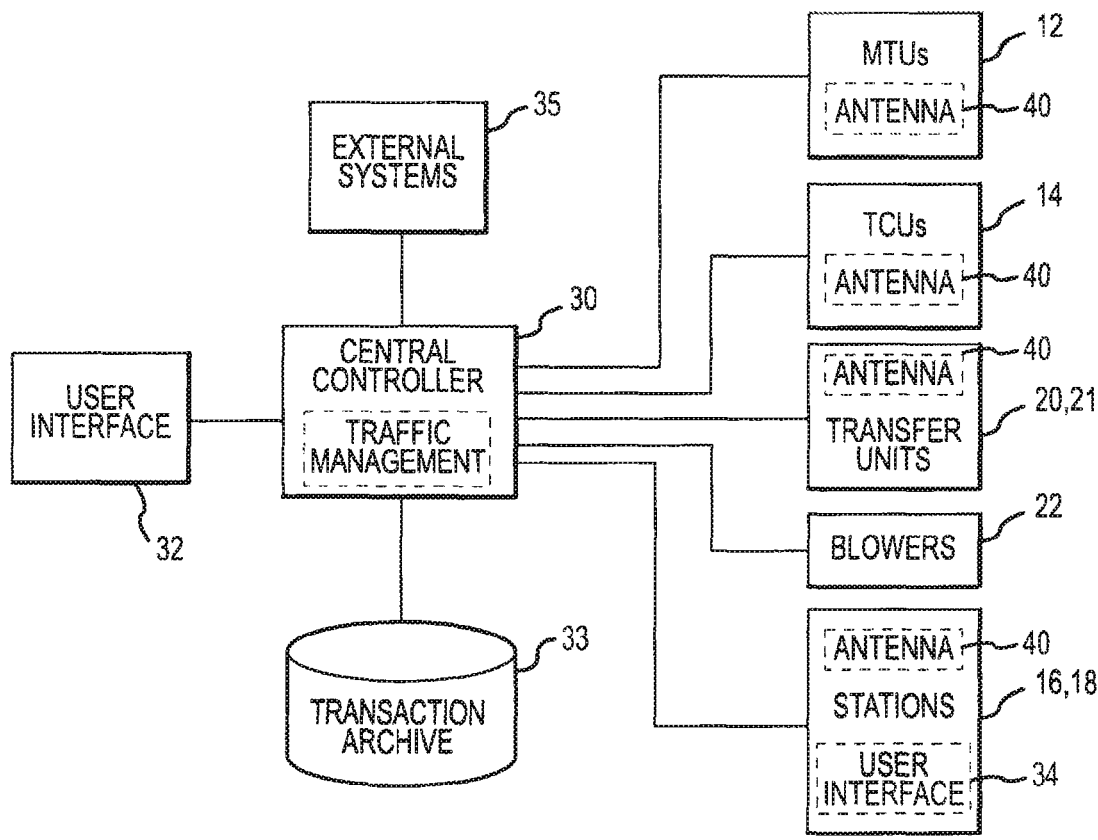
FIG. 2 discloses a system diagram for the operation and monitoring of a pneumatic carrier system.

FIG. 2 illustrates an electrical system diagram for the exemplary pneumatic carrier system 10 described herein. A system central controller 30 (SVC) electrically connects all of the pneumatic system components described in FIG. 1 and controls their operation. The SCC 30 may include a digital processor and memory and/or may include multiple programmable digital computers. Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units.

Each of the components described above in relation to FIG. 1 may include one or more electrical and/or electro-mechanical components that provide for the physical movement of a carrier within the system 10 and/or the obtainment/provision of information relating to the location of the carriers within the system 10. In this regard, components 12, 14, 16, 18, 20, 21 and 22 shown in FIG. 2 are representations of the various electrical and electro-mechanical systems employable by the pneumatic carrier system 10. Although in FIG. 2 they are represented single blocks, one skilled in the art will realize that the block for each type of device represents the electronics for a number of the same or similar type of components positioned throughout the system which provides for its operation. Of note, each of the user stations 16, 18, MTUs 12 and TCUs 14 (e.g., system components) reports its operation and/or current stations to the SCC. Further, these system components may, in some implementations, read identification information from identification devices such as ID chips incorporated into each of the carriers.

Figure 3:
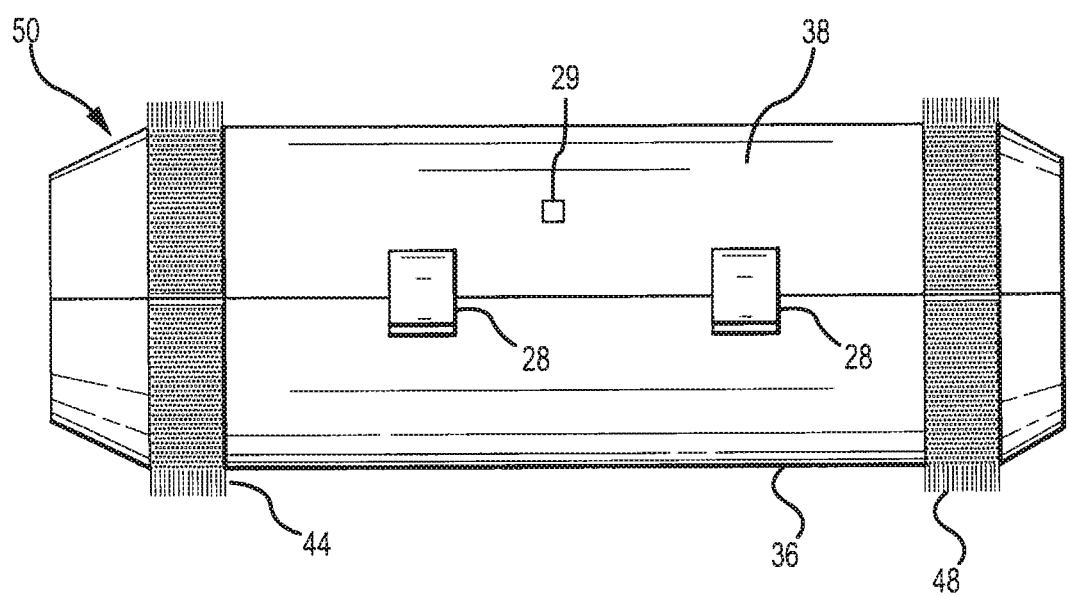
FIG. 3 discloses a view of the pneumatic carrier.

Disclosed in the FIG. 3 is a view of a pneumatic system carrier 100. In the exemplary carrier, the carrier 50 includes first and second shell members 36 and 38 that are adjoinably cylindrical in cross-section for use in correspondingly cylindrical tubes of the system 10. A hinge member (not shown) may pivotally interconnect the shell members 36 and 38 and latches 28 may secure the first shell member to the second shell member in a closed configuration. Also included as part of the carrier 50 are wear bands 44, 48. In one embodiment, one of the shell members 36, 38 and/or wear bands 44, 48 incorporates an ID chip (e.g., disposed beneath one or both bands 44, 48). Such an ID chip 29 may store and/or provide access to identification information written thereon. However, aspects of the disclosed systems and methods are operative with or without the ability to identify individual carriers.

Returning to the electrical system diagram of FIG. 2, it may be seen that various transfer units 20, 21 and blowers 22 are also electrically connectable to the SCC 30. Through these connections, SCC 30 may send command signals to these devices so that they are actuated and operating at particular times and in particular sequences to affect the completion of the various carrier transactions. Other signals exchanged may include various monitoring signals that indicate the devices are operating as desired. The transaction record of a carrier transaction may record some or all of these signals and thereby record the progress of a carrier through the system.

The SCC 30 is further connectable to a transaction archive 33, or database, which stores transaction records for carriers 50 moving within the system 10. The transaction records may include information for each carrier 50 moving through the system. Further, the transaction records may include progression information obtained via inputs received from user stations 16, 18, TCUs 12 and MTUs 16 or other system components along the travel path of a given carrier 50. The use of these transaction records is described in greater detailed below.

In operation, a pending transaction record is generated when a user initiates a transfer event. That is, when a carrier 100 is employed for carrying an object from an origination station 16, 18 to a destination station 16, 18, a pending transaction record is generated that includes an originating location/station and a destination location/station. Once a destination is selected for the particular carrier 100, a path is calculated for the carrier 100 through the pneumatic carrier system 10 to the destination. This information may be stored in the transaction record within the transaction archive 33. However, such preplanned travel path information is subject to dynamic alteration based on system conditions. Therefore, such preplanned travel path information may not be stored to the transaction record and/or may be of limited value for recovering carriers from the system. Once system components are set to provide pressure vacuum and/or transfer functionality to initiate transfer of the carrier, the transaction record becomes active. During transit of the carrier, system components that handle the carrier are recorded in the active transaction record. Once the carrier arrives at the destination station, the transaction record records the arrival, the transaction is completed and the transaction record is closed (i.e., no longer pending/active).

FIGS. 4A-4C illustrate three exemplary transaction records. These transaction records illustrate the transport progression of a carrier from a first station to a second as illustrated in the exemplary pneumatic system of FIG. 5. Initially, a user initiates a transfer of a pneumatic carrier from a first station 321 to a second station 123 within the system 10. Accordingly, the user may insert the carrier into the launching device of the first station 321 and enter any destination information into the user interface thereof. The system controller (not shown) receives this information and generates a pending transaction record 100*a* as illustrated in FIG. 4A.

The transaction record 100*a* includes a transaction number as well as an origination/dispatch location or station and destination location and/or receiving station information. FIG. 4B illustrates a completed or closed transaction record that is generated during the transit of the carrier from the first station 321 to the destination station 123. As shown, dispatch time is included within the transaction record 100*b*. Furthermore, the transaction record records travel path and/or component handling the carrier during transit. For instance, after dispatch from the origination station 321, transfer unit 222 handles the carrier and transfers it into a pneumatic tube for transfer to the bypass transfer unit 217. Once received within the bypass transfer unit 217, a transfer port of the transfer unit 217 may align the carrier with another tube line to continue the transit of the carrier towards its destination location. As shown, the bypass transfer may have more than one option for sending the carrier to a subsequent pneumatic component, in this case, multi-linear transfer unit 121. For instance, the transfer unit 217 may utilize one of two parallel pneumatic tubes 202 and 204. The SCC may dynamically select the tube 202 or 204 for transfer based on current network conditions. That is, if line 202 is immediately available, the transfer port of the bypass unit 217 may be set to utilize line 202. Accordingly, the blower 224 may then provide positive pressure that launches the carrier into line 202 where TCU 219 handles the carrier. The transaction record records this contact. The transaction record then records receipt by the MTU 121. The multi-linear transfer unit transfers the received carrier to an outlet port aligned with pneumatic tube 208. After passing into line 208, TCU 219 handles the carrier and delivers the carrier to user station 123. The transaction record records the arrival and the transaction record is closed.

FIG. 4C illustrates an unresolved transaction record. This unresolved transaction record again illustrates the transfer of a carrier from station 321 to station 123. However, system disruption occurs during the transit of the carrier between the origination and destination stations. The SCC retrieves this transaction record and potentially numerous other unresolved transactions that were active during the system disruption. The system controller utilizes this unresolved transaction record to attempt recovery of the carrier associated with the transaction without requiring a purge of the entire system. In this regard, the system controller is operative to utilize entries made into the transaction record to identify or infer a putative location of the carrier within the system such that the carrier can be identified and/or continue to its destination station. By identifying the system components that have contacted the carrier during its transit, the SCC may identify a segment of the pneumatic tube system believed to contain the 'stranded' carrier.

Figure 5:
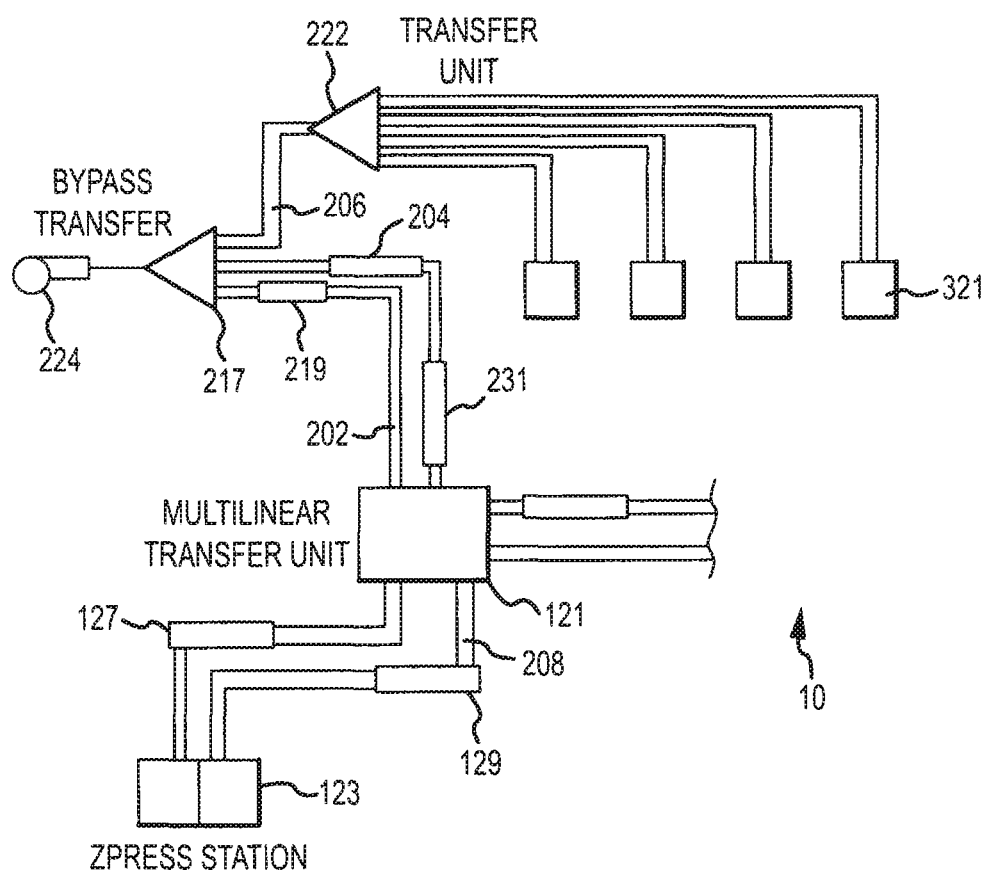
FIG. 5 illustrates a portion of a pneumatic carrier system.

In relation to FIG. 4C and FIG. 5, the last system component recorded as having contacted the carrier is the bypass transfer unit 217. That is, it is known that the bypass transfer unit 217 received the carrier from the transfer unit 222. As no further entry exists within the transaction record, presumably, the carrier either is in the bypass transfer unit 217 or is in a pneumatic tube between the bypass transfer unit and a subsequent system component. In an arrangement where one or more locations are possible, it may be desirable to procure status information of one or more system components to determine the likely/putative location of the carrier. In the present example, this may include determining the pressure or vacuum setting of the blower 224. If the blower is set for a pressure setting, the assumption is that the system was preparing to pressurize or was pressurized and that the carrier is partway down either tube 204 or tube 202. Likewise, it may be desirable to query the status of the bypass transfer unit 217 to identify a port location of a transfer device disposed within the bypass transfer unit 217.

Figure 6:
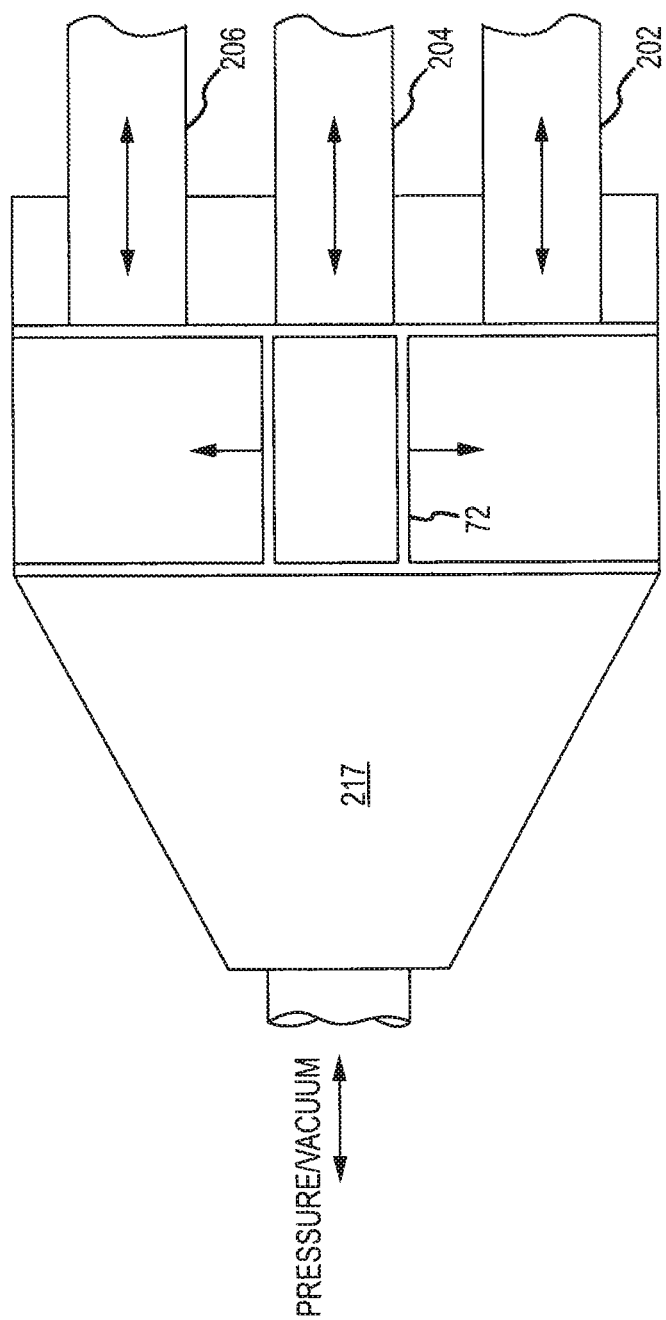
FIG. 6 illustrates an exemplary transfer unit.

FIG. 6 illustrates a breakaway view of an exemplary bypass transfer unit 217. As can be seen, the bypass transfer unit 217 connects a number of incoming tubes 202, 204 and 206. A first tube (e.g., tube 206) may deliver an incoming carrier for receipt within a carrier delivery device 72 (i.e., bucket). The bucket is moveable along guides so as to receive carriers, directed to the bypass transfer unit through a first tube therein, in response to an instruction signal received from the SCC, and move the received carrier along the guides to align the carrier with a selected exit pneumatic tube. For instance, in the present example, the bucket 72 may receive the carrier while the bypass transfer unit 217 is under vacuum and then move the carrier to a second port position where the carrier may be dispatched through tube 204 once the blower 224 applies positive pressure to the bypass transfer unit 217.

Upon determining the status of the bypass transfer unit 217, for example, determining port location of the bucket 72 is aligned with tube 204 and that the bypass transfer unit itself does not contain the carrier, the carrier is located in tube 204 between the bypass transfer unit 217 and a subsequent system component (e.g., TCU 231). Accordingly, the system controller may operate the segment of the pneumatic system between these components 217, 231 to effectuate delivery to one of the components. For instance, applying vacuum to tube 204 may draw the carrier (i.e., if located therein) back into the bypass transfer unit 217. Alternatively, the blower may apply pressure to tube 204 to direct the carrier to the subsequent/next pneumatic system component, in this case, TCU 231. In either case, the SCC monitors system components to identify if one of the components receives a carrier. If so, the received carrier is presumably the carrier associated with the unresolved transaction. Accordingly, at this time, the SCC may obtain the destination location from the transaction record and continue routing the carrier to the destination location.

It will be appreciated that, in instances where multiple unresolved transactions exist, it may be preferable and/or necessary to confirm the location of each unresolved carrier prior to continuing delivery of a given carrier to a destination location. That is, a second carrier may occupy a subsequent portion of the pneumatic system and thus prevent delivery of a recovered carrier. If a carrier is located for each unresolved transaction record, then the system may restart without purging the entire system. Alternatively, if one or more transactions remain unresolved, a user may take additional remedial measures. For instance, a user may implement a full system purge. Alternatively, in systems that have multiple different zones, purging may not occur in zones that are not associated with the origination, destination or intermediate locations of unresolved transaction records. That is, in the present embodiment of FIG. 5, which is a zone of the system of FIG. 1, it may be desirable to purge the portion of the system shown in FIG. 5 while not purging the remainder of the system illustrated in FIG. 1 (e.g., providing no unresolved transactions are associated with the remainder of the system).

Though discussed above as including pressure settings, vacuum settings; and port locations, it will be appreciated that the status or phase information of different components may include additional indications. For instance, one or more system components may be operative to identify the presence of a carrier contained therein. For instance, various bypass units, transfer units and/or stations may be operative to send a signal indicating that they contain a carrier. In this regard, if the system controller queries one of these components, the system controller may obtain carrier location without subsequent operation of the system.

For instance, in a pressure vacuum zone, a phase setting may be pending, in which case the carrier may be located in the station. Accordingly, no recovery is required. Another phase is setup, during which one or more system components is arranged for delivery of a carrier. In the setup phase, the carrier is also typically located in the station awaiting transit, and no recovery is required. In a vacuum phase, a blower is applying vacuum to a segment of the system. In such a phase, it may be desirable to continue applying vacuum in the system to see if a carrier arrives at one of the system components in the portion of the system receiving the vacuum. The same applies for a pressure phase where the blower is providing positive pressure through one or more system components and the pneumatic tubes contained there between. In an arrival phase, a carrier may be located above a receiving station, and recovery may simply require dropping the carrier into the station. Other phases and status information are possible and considered within the scope of the present invention.

Figure 7:
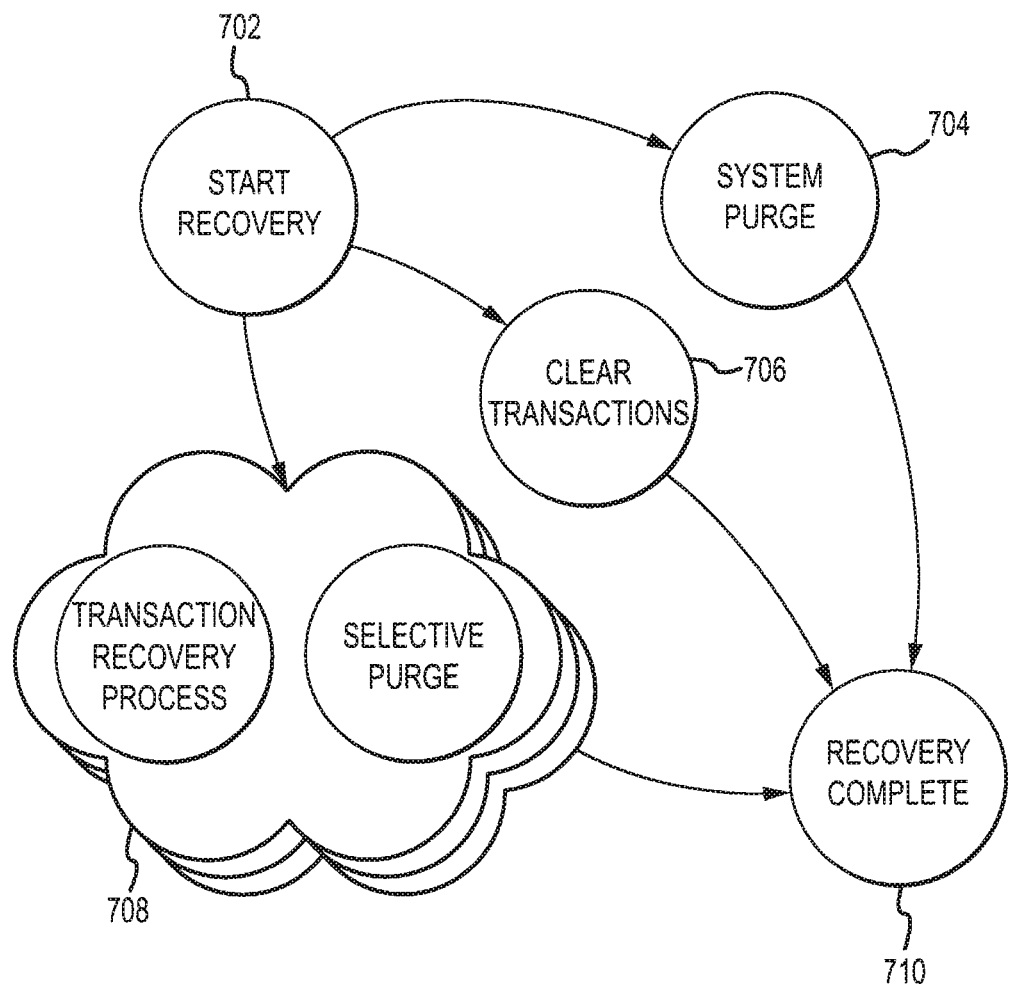
FIG. 7 illustrates a process flow illustrating recovery options in a pneumatic carrier system.

FIG. 7 provides an overview of the system recovery process that a user may implement upon receiving an indication that there has been a disruption to the normal operation of the pneumatic system. That is, a user may initiate a recovery process (700). The user may select one of three recovery processes 704-708. Such processes include an entire system purge 704 that systematically purges the entire pneumatic system to remove all carriers from the system. As noted above, such system-wide purges may result in considerable down time to the system, thereby reducing its usefulness to the owners of the system. As a second alternative, a user may clear unresolved transactions 706 and immediately restart the operation of the pneumatic system. Clearing transactions 706 may be appropriate in cases where there are no active transactions. That is, in instances where there is an indication that no carriers are located within the system, it may be appropriate to clear any pending transactions and simply restart the system. However, if any carriers are within the system, clearing the transactions may result in the presence of a floater within the system, which may cause delivery problems thereafter. As a third option, the user may elect to perform a selective purge/transaction recovery process 708. In this regard, the SCC may access transaction records of active and/or pending (i.e., unresolved) transactions for relocating carriers associated with those transactions.

Figure 8:
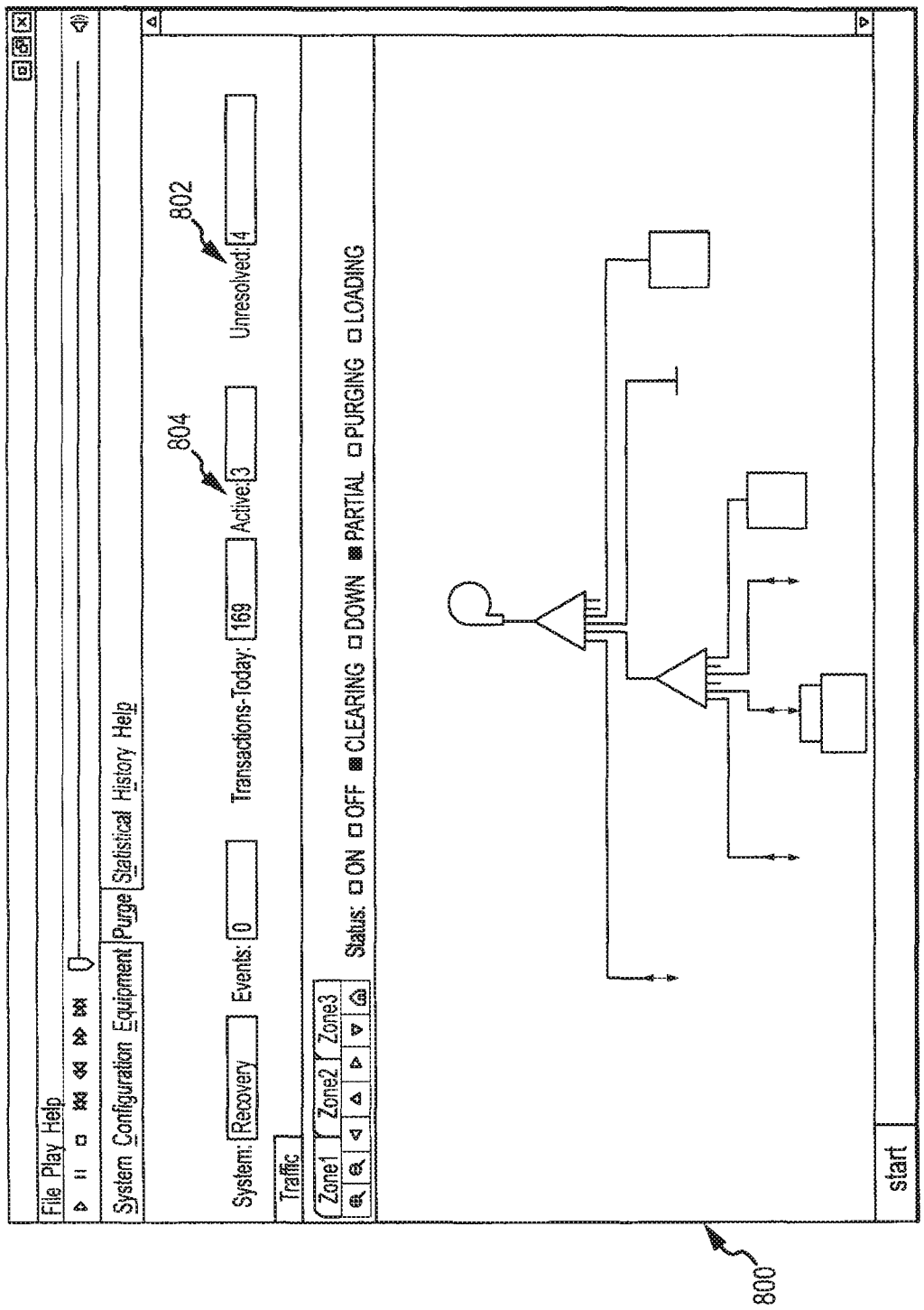
FIG. 8 illustrates one embodiment of a user interface.

FIG. 8 illustrates an exemplary user interface display 800 for use during the recovery process 700. As shown, a user may elect to partially clear the system (i.e., selectively purge) to recover unresolved transaction carriers. The user interface 800 may further provide an indication of the total unresolved transactions 802 as well as the total active transactions 804. In instances where there are no active transactions (i.e., carriers located within the system), a user may elect to simply clear the system and start over. In the present instance, there is an indication that there are three active carrier transactions and a total of four unresolved transactions. In this regard, one of the unresolved carrier transactions may be a pending action that is still located at an origination station. It will be appreciated that, in various implementations, pending transactions may be cleared and active transactions may be selectively purged from the system.

Figure 9:
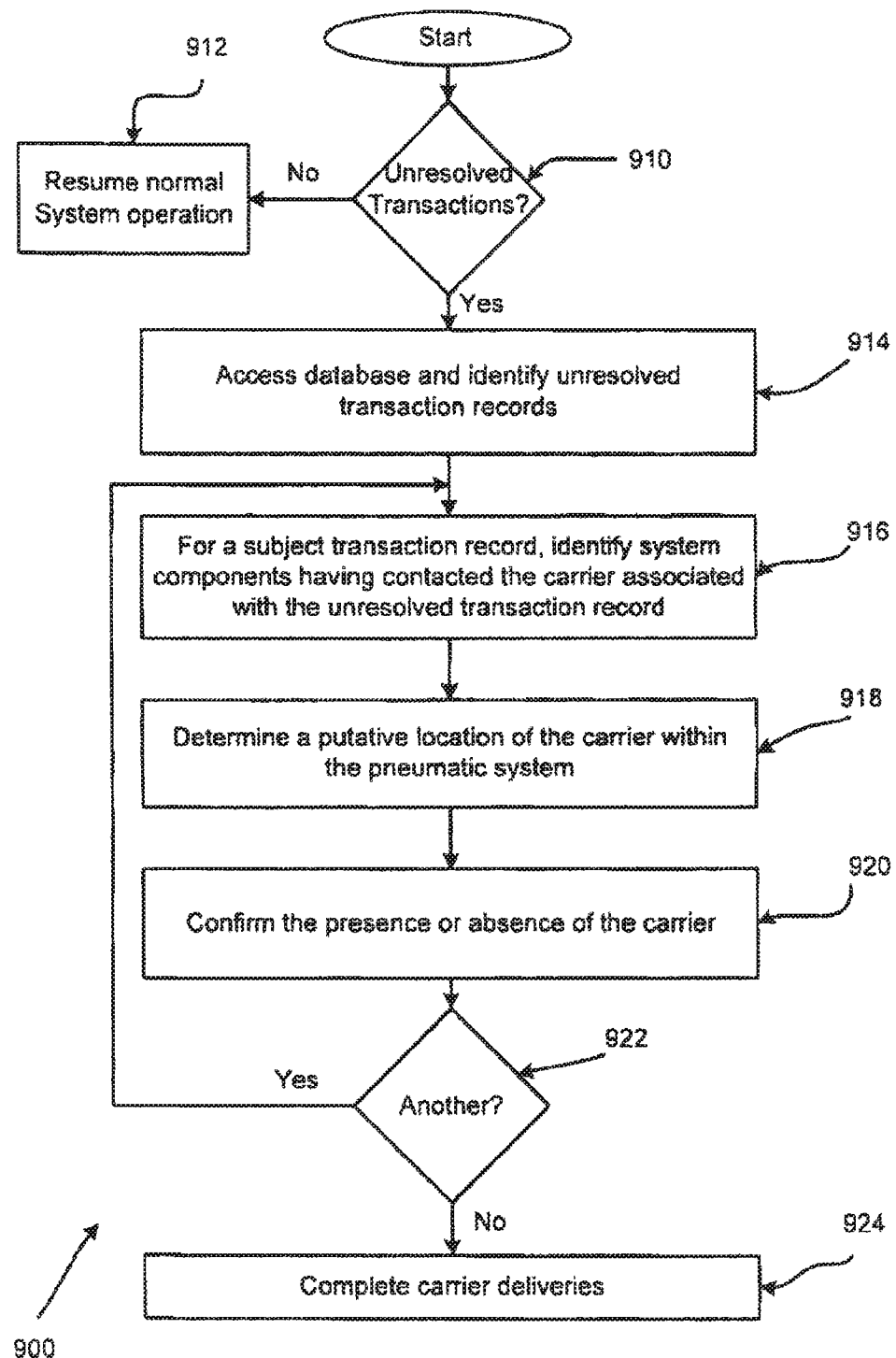
FIG. 9 illustrates one recovery process that may be performed by the presented system.

FIG. 9 illustrates a process 900 for use in the selective purging/recovery of carriers from a pneumatic system. After an indication of a system disruption, the system makes a determination 910 as to whether there are any unresolved transactions. If not, the system may simply restart normal operations 912. If there are unresolved transactions, the process includes accessing a database 914 to identify unresolved transaction records. For a given transaction record, the SCC identifies 916 system components that have contacted the carrier. As noted above, each component that contacts the carrier generally records such contact to a corresponding transaction record. In this regard, such system component information provides travel path information through the pneumatic system. Utilizing this information, the system is operative to determine 918 a putative location of a subject carrier within the system. The system may then confirm 920 the presence or absence of the carrier. This process may be iteratively repeated 922 until each unresolved carrier transaction record has been identified and putative locations for carriers associated with each such record are identified. The system may then complete carrier deliveries 924 for all identified carriers. Once such deliveries are completed, the system may restart normal operations. Alternatively, if one or more of the carriers associated with the unresolved transaction records is not located, the entire system or a zone including the non-located carrier may be purged to remove the carrier from the system.

The determination of a putative location of a carrier associated with a transaction record may include obtaining status or phase information of one or more system components. Such status/phase information may include bucket locations of transfer units, pressure or vacuum settings of blower units. Such system component status/phase information may allow for resolving any further uncertainties associated with a given carrier transaction and thereby provide a better indication of a putative location of the carrier within the system. Further, information may include active sensor responses indicating that a carrier occupies a system component in a travel path of a given transaction record. In this regard, the carrier occupying the system component may be presumed to be the carrier associated with the transaction record.

Figure 10:
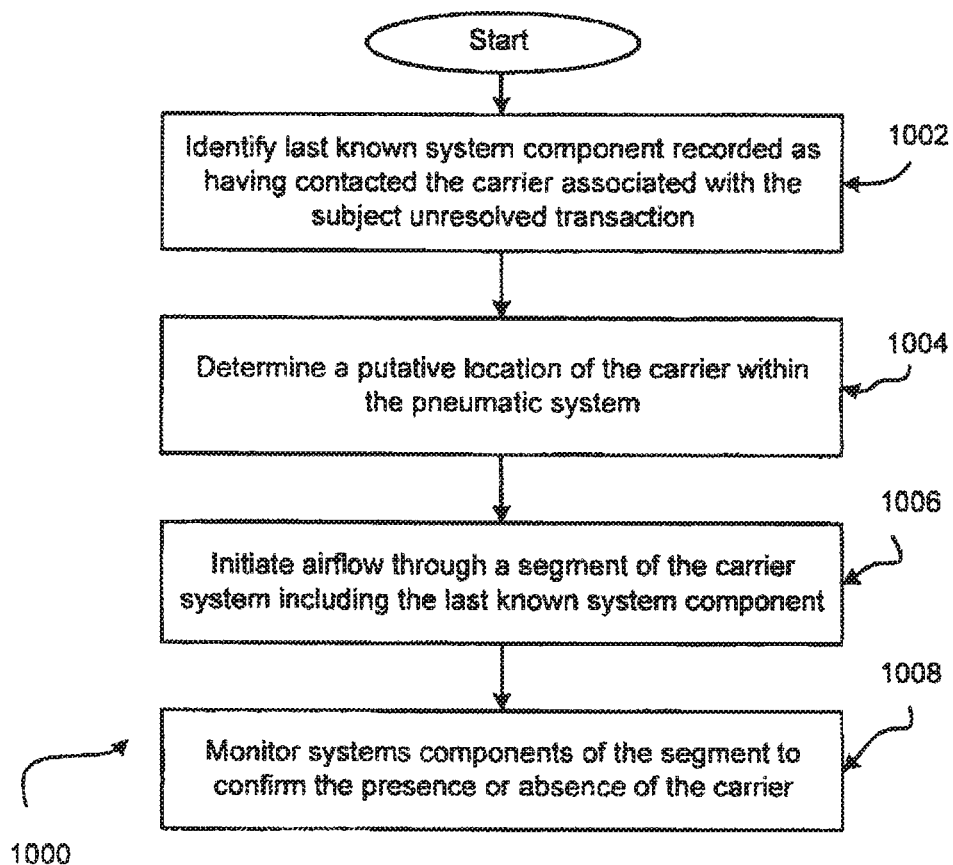
FIG. 10 illustrates another recovery process that may be performed by the presented system.

FIG. 10 illustrates one process 1000 for use in confirming the presence or absence of a carrier's putative location within the pneumatic system. Initially, the process includes identifying 1002 the last system component recorded as having contacted the carrier. That is, the system controller may identify from a transaction record the system component that most recently contacted a carrier. Based on this information and/or status information of one or more system components, the controller determines 1004 the putative location of the carrier within the system. The system controller may then initiate airflow 1006 through a segment of the carrier system including the putative location of the carrier. Such a segment typically includes the last system component having contacted the carrier. Furthermore, this segment will typically include the next system component that will likely contact the carrier. The process includes monitoring 1008 system components of the segment to identify carrier receipt. It will be appreciated that the airflow through the system may be initiated to continue proposed delivery or to attempt to return the carrier back to the last system component identified as having contact at the carrier. For instance, reversing airflow through a tube segment may draw the carrier back into the last system component. Accordingly, if that system component receives a carrier, its identity may be confirmed as being the carrier associated with the transaction record. Alternatively, based on the last system component information and the putative location, a decision may be made to continue moving the carrier forward to a subsequent/next system component. This is more of a passive recovery process where, if a subsequent system component receives a carrier, it is identified as being the carrier associated with the unresolved transaction record and delivery may be completed.

Inferential logic may also be utilized in applications other than system recovery. One particular application is the identification of extraneous carriers within a pneumatic tube system. For instance, the SCC may monitor the system in relation to active transaction records to identify the existence of unidentified or unanticipated carriers. In one arrangement, the system monitors the components along the expected travel paths (or portions of such travel paths) of all active transactions. If a system component outside of the expected travel paths generates a signal indicating receipt of a carrier, remedial measures may be taken to identify and/or redirect the unanticipated carrier. Such remedial measures may include confirming the presence or absence of carriers for each currently active transaction. If a carrier is located for each active transaction (e.g., using the methods discussed above) the unanticipated carrier may be transported to a recovery location for identification and redirection. Alternatively, if a carrier cannot be located for one of the active transactions, it may be inferred that the unanticipated carrier corresponds to the active transaction for which no carrier can be located. Accordingly, this carrier may be directed to this location information in the active transaction record. By identifying carrier received signals that are received outside of an expected travel paths or portions of such paths, an unanticipated carrier may be identified before multiple carriers become displaced in FIFO processing systems.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for use in purging a pneumatic carrier system where the pneumatic carrier system includes a plurality of user stations, pneumatic tubes and transfer devices, comprising:

receiving, at a pneumatic carrier system controller, a pneumatic carrier system recovery request for recovering carriers remaining in the pneumatic carrier system after a shut-down of the pneumatic carrier system;

accessing an electronic database to retrieve unresolved carrier transaction records stored on a computer readable storage medium to identify one or more carriers stranded in the pneumatic carrier system after said shut-down;

for at least one unresolved carrier transaction record, operating said system controller to:

identify, from said at least one unresolved transaction record, system component transaction information identifying a last system component recorded as having contacted a carrier associated with said unresolved transaction record;

based on said system component transaction information, determine a segment of said pneumatic carrier system putatively containing the carrier associated with said unresolved transaction record; and generating an airflow between the last system component and through said segment to confirm the presence or absence of said pneumatic carrier.

2. The method of claim 1, further comprising:
upon confirming the presence of the carrier, routing the carrier to a destination location identified from said unresolved transaction record.

3. The method of claim 1, wherein operating the system controller to identify system component transaction information comprises:
identifying a last system component recorded as having contacted the carrier associated with the unresolved transaction.

4. The method of claim 1, further comprising:
operating the system controller to procure system component status information of at least said last system component recorded as having contacted said carrier.

5. The method of claim 4, wherein operating the system controller to procure system component status comprises:
accessing an electronic database including said status information of at least a portion of pneumatic system components of said pneumatic carrier system, wherein said status information is stored on a computer readable storage medium.

6. The method of claim 4, wherein operating the system controller to procure system component status comprises:
sending an electronic query to at least said first system component recorded as having contacted said carrier; and
receiving at least one status response from at least said first system component recorded as having contacted said carrier.

7. The method of claim 6, wherein one said status response comprises an indication that the system component contains a pneumatic carrier.

8. The method of claim 6, wherein at least one status response comprises:
a pressure or vacuum setting of a system pressure component.

9. The method of claim 6, wherein at least one status response comprises:
a position of a transfer device.

10. The method of claim 1, wherein operating the system controller to procure system component status comprises:
identifying, from said unresolved transaction record, the last system component having handled the carrier.

11. The method of claim 10, further comprising:
based on said pneumatic carrier path, identifying the next system component to handle the carrier; and
operating the pneumatic system to effectuate airflow between said last system component and said next system component.

12. The method of claim 11, further comprising:
monitoring the next system component for the receipt of the carrier.

* * * * *